INVENTOR.
JEAN LEBLOND
BY
ATTORNEY

United States Patent Office 3,580,782
Patented May 25, 1971

3,580,782
APPARATUS FOR SHAPING TIRES
Jean Leblond, Compiegne, France, assignor to Uniroyal Englebert France S.A., Paris, France
Filed Sept. 12, 1968, Ser. No. 759,401
Claims priority, application France, Sept. 15, 1967, 121,259
Int. Cl. B29h 17/26
U.S. Cl. 156—415
35 Claims

ABSTRACT OF THE DISCLOSURE

A tire building machine comprising a pair of variably spaced carcass support rings coaxially disposed with respect to each other and providing for direct inflation of a first stage carcass supported thereon. At least one of the rings includes an expandible and contractible elastic band for sealingly engaging the respective bead of the carcass.

---

This invention relates to an improved tire building machine having an improved tire carcass shaping mechanism.

In the building of tires having breakers or belts incorporated in the crown area of the tire, as in the case of radial ply, belted tires for example, a two stage process is conventionally employed. During the first stage of building, a cylindrical carcass is formed having (1) one or more rubber covered cord plies wound around and interconnecting axially spaced, parallel, coaxial, bead cores and (2) a layer of rubber sidewall stock on each sidewall area of the carcass, intermediate the eventual crown area thereof and the two bead areas thereof. Such a carcass is referred to herein as the "first stage carcass." During the second stage of building, the shape of the first stage carcass is changed from a cylinder to a toroid and one or more rubber covered cord breaker piles and a rubber tread slab are added to the crown portion of the carcass to form what is referred to herein as the "second stage carcass." The term "rubber" as used herein is intended to cover natural rubber, man-made rubber and rubbery materials. The term "cord" as used herein is intended to cover single and multiple strands, filaments, wires or cables of natural and synthetic textile materials such as cotton, rayon, nylon, polyester, glass fiber, and the like, metal and/or such other materials as may be used as reinforcements in pneumatic tires.

A number of machines have heretofore been developed which are utilized in building second stage carcasses in accordance with the general process referred to above (see, e.g., U.S. Pat. No. 3,125,482 to W. Niclas et al., dated Mar. 17, 1964). In these machines the cylindrical shape of the first stage carcass is changed into the toroidal shape of the second stage carcass on an inflatable drum. This drum usually comprises spaced, movable end plates and a cylindrical rubber diaphragm, the diaphragm and end plates together defining an inflatable chamber. Upon concurrent axial movement of the end plates toward each other and pressurization of the inflatable chamber, the first stage carcass mounted on the drum undergoes a change of shape to arrive at the shape of a second stage carcass.

In the aforesaid machines a breaker-tread assembly is carried on the inner surface of a transfer ring to a position encircling the eventual crown area of the first stage carcass on the inflatable drum. When the inflatable drum is expanded the crown area of the carcass thereon expands into pressurized contact with, and adheres to, the inner surface of the breaker-tread assembly to form the second stage carcass. The transfer ring is then expanded to release it from contact with the breaker-tread assembly and, finally, is moved clear of the second stage carcass, allowing removal of the carcass from the inflatable drum following deflation of the latter. It is, of course, very difficult to manufacture the rubber diaphragms in such manner that they will assume an exactly predictable shape and size when expanded. Moreover, such diaphragms must be frequently replaced at substantial expense.

Although commercially acceptable tires can be made on tire machines using the above process, the tires made on such machines tend to lack uniformity from one to another and have a high scrappage range. This is caused among other things, by distortion and stretching of the various elements of the first stage carcass as these elements are manipulated on the conventional shaping drum.

Another machine utilized in the building of second stage carcasses is described in copending U.S. patent application Ser. No. 717,786, filed Apr. 1, 1968. In the latter machine—which does not require an inflatable diaphragm—a pair of variably spaced carcass support discs are provided for supporting the opposite beads of the tire carcass during toroidal shaping of the latter. The discs are of generally fixed diameter. In operation the first stage carcass must be manipulated into proper position on these discs while the second stage carcass must be manipulated for achieving removal thereof from the discs. Such manipulation, if not carefully done, can result in distortion and stretching of certain of the component elements of the carcass.

Accordingly, the primary objective of the present invention is to obviate the foregoing disadvantages by providing a tire building machine having an improved tire shaping drum.

Another object of this invention is to provide a tire building machine having an improved carcass shaping mechanism therein for more precisely controlling the changing of shape that a first stage carcass undergoes in becoming a second stage carcass.

Yet another object of this invention is to provide a tire building machine heaving an improved shaping drum which permits a first stage carcass to be positioned thereon and a second stage carcass to be removed therefrom all without deformation, distortion or stretching of the component elements of the carcass.

A still further object of the invention is to provide a tire building and shaping drum which does not require an inflatable diaphragm and yet permits easy and distortion-free mounting and dismounting of a carcass thereon.

Further advantages and objects of the invention will become apparent as the following description proceeds.

Briefly stated, and in accordance with one embodiment of this invention, a shaping drum is provided, comprising a pair of radially expansible and contractible coaxial tire carcass support rings; a sealing means in the form of a pair of endless elastically deformable bands each trained around one of said rings and adapted to fluidtightly connect the rings, in expanded condition thereof, to the opposite beads of the tire carcass, respectively, for forming with the interior of the carcass a fluidtight chamber; shifting means cooperating with the rings for axially shifting the latter toward and away from each other; and a source of pressure fluid communicating with the said chamber for supplying pressure fluid thereto so as to radially expand the mid-portion of a cylindrical carcass positioned on said rings when the latter are moved toward each other in expanded condition thereof, said rings in contracted condition permitting distortion free mounting and dismounting of the carcass thereon.

While the specification concludes with claims particularly pointing out and distinctly claiming the subject matter regarded as this invention, it is believed that the invention will be better understood from the following description, taken in connection with the accompanying drawings, in which:

Figure 1:
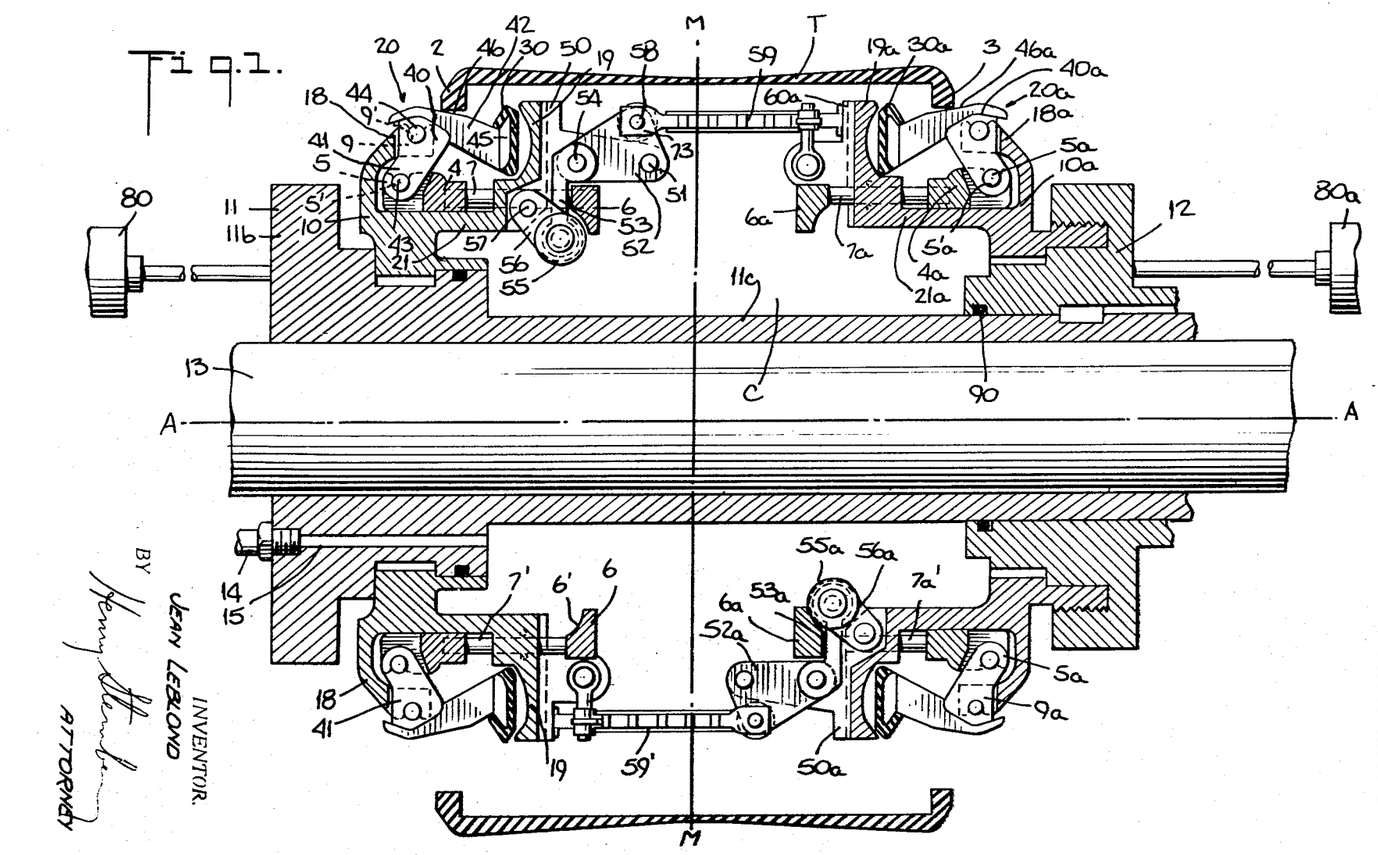
FIG. 1 is a sectional elevational view of the shaping apparatus according to the present invention showing the latter in a first condition of operation.

Referring first to FIG. 1, the tire carcass supporting portion of the shaping mechanism comprises two ring means in the form of annular ring means 10 and 10a which share the axis A—A in common with the transfer ring R mentioned earlier herein. The ring means 10 and 10a are provided with radially expansible and collapsible means 20 and 20a which cooperate with respective bead areas 2 and 3 (FIG. 1) of the first stage carcass T in supporting the carcass on the shaping mechanism. The ring means 10 and 10a also include annular sealing bands 30 and 30a, respectively, of elastomeric material such as, for example, rubber. These sealing bands 30 and 30a are adapted to engage the inner portions of the bead areas 2 and 3, respectively, of a first stage carcass T mounted on the ring means 10 and 10a.

The construction of the expandible and collapsible means 20, 20a, which will be described in detail below, is such as to provide a continuous peripheral seal between the bead areas 2 and 3 of the carcass T and the ring means 10 and 10a of the shaping mechanism so as to facilitate direct inflation of the carcass, regardless of slight irregularities in the shape of the latter. The rings 10 and 10a are axially relatively movable with respect to one another (always in symmetry with plane M—M to accommodate different size carcasses, to cooperate with the carcasses during inflation of the latter and to facilitate the shaping of first stage carcasses into second stage carcasses.

The relative movement of the rings 10 and 10a along the axis A—A may be obtained preferably as follows. Ring means 10 is fixedly supported on a sleeve 11. Sleeve 11 includes a hub portion 11b and a cylindrical portion 11c extending axially from said hub portion toward the ring means 10a, the latter being supported on a sleeve 12, which is, in turn, axially slidably received on the cylindrical outer surface of the sleeve 11 and suitably keyed or splined to prevent relative rotation therebetween. A conventional shifting means 80, 80a is suitably connected to the sleeves 11 and 12 for axially shifting the latter along shaft 13 in symmetry with a median plane M which is normal to the axis of shaft 13. The ring means 10 and 10a are suitably fixed respectively to the sleeves 11 and 12 to prevent relative movement therebetween.

Each of said ring means 10 and 10a preferably includes a pair of axially spaced annular flanges 18 and 19 and 18a and 19a, respectively, extending radially outwardly at opposite ends of intermediate cylindrical hub portions 21 and 21a.

Identical parts on opposite sides of the structure illustrated in the drawings have been given identical reference numerals differing only in the suffix "a." For the sake of brevity only one of each set of identical parts will be described below, unless otherwise indicated.

Figure 8:
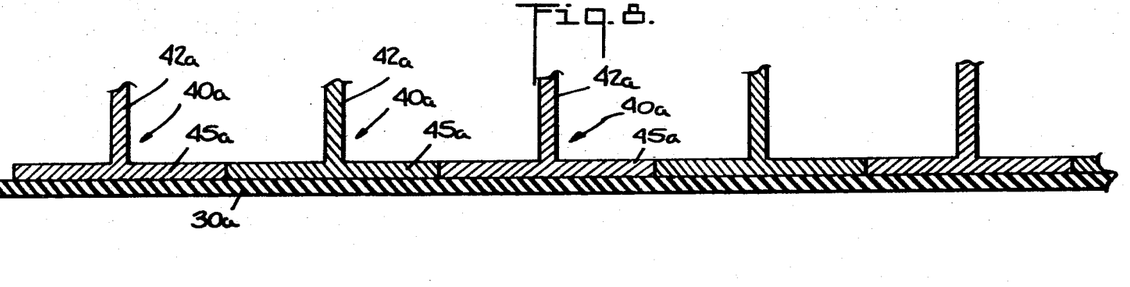
FIG. 8 is a sectional view taken along line VII—VII of FIG. 7 showing a portion of the radially expansible and contractible means in contracted condition thereof together with a portion of the elastically deformable member associated therewith.

The annular flanges 18 and 19 define with the cylindrical hub 21, an annular channel in which there is disposed a relatively axially movable coaxial annular ring member 4. The annular ring member 4 is configurated to slide in axial direction on the outer cylindrical surface of the hub portion 21. The annular ring member 4 is connected to a coaxial ring member 6, situated in the space between the flanges 19 and 19a, by at least two, preferably diametrically opposed, tie rods 7 and 7', respectively rigidly connected at opposite ends thereof to the annular member 4 and to the ring 6 and disposed parallel to the axis A—A. The rods 7 and 7' are fluidtightly, but slidably, received in suitable bores provided in the flange 19 so that the rings 4 and 6 will move as a unit. The ring 4 is provided on its periphery with a plurality of circumferentially distributed teeth 5 each provided at its outer face with a circumferentially extending groove 5'. A plurality of similar circumferentially distributed circumferentially grooved teeth 9 are provided along an axially inwardly extending peripheral portion of flange 18. The number of such teeth 9 equals the number of teeth 5 provided on ring 4 so that the ring 4 and flange 18 may be positioned with the teeth 5 in registry with the teeth 9. Circumferentially distributed in the annular cavity formed by the flanges 18 and 19 and the hub portion 21, are a plurality of L-shaped arms 40 each of which is provided along one leg 41 thereof with a pair of spaced parallel shafts 43 and 44. Each of these shafts extends outwardly from both side faces of the generally planar leg 41. The legs 41 of arms 40 are positioned in the gaps intermediate adjacent ones of the teeth 9 and extend down into the corresponding gaps intermediate adjacent ones of the teeth 5 which are in registry with the teeth 9. With the arms 40 positioned in this manner the shafts 43 and 44 are suiably received in the circumferentially extending grooves 9' and 5' respectively, of the said adjacent pairs of the teeth 9 and 5 respectively. It will now be seen that axial movement of the ring 4 with respect to the cylindrical hub (FIG. 1) results in pivotal movement, in radial planes, of the arms 40. The free end portions of the arms 40 thus swing radially outwardly as the ring 4 moves axially with respect to the hub 21 in a direction from the flange 18 toward the flange 19. Integral with the said free end of each of the arms 40 is a transversely extending arcuate segment portion 45. The segments 45 of all of the circumferentially distributed arms 40 together define, in the radially contracted position of the arms 40 (FIG. 1) a substantially continuous annular surface (FIG. 8) over which there is trained—preferably in stretched condition— the annular elastomeric band 30, preferably of rubber.

The annular band 30 is provided with opposing transversely extending marginal edge portions 30', 30" (FIG. 2) adapted to grip the inner and outer edge portions, respectively, of the plurality of segment portions 45. The endless elastomeric band 30 stretched over the segmental portions 45 of the circumferentially distributed arms 40 is shown in FIG. 1 in its contracted condition. It will be seen that the band 30 tends, as a result of its elastic properties, to urge the arms 40 into the contracted condition thereof (FIG. 1).

Figure 2:
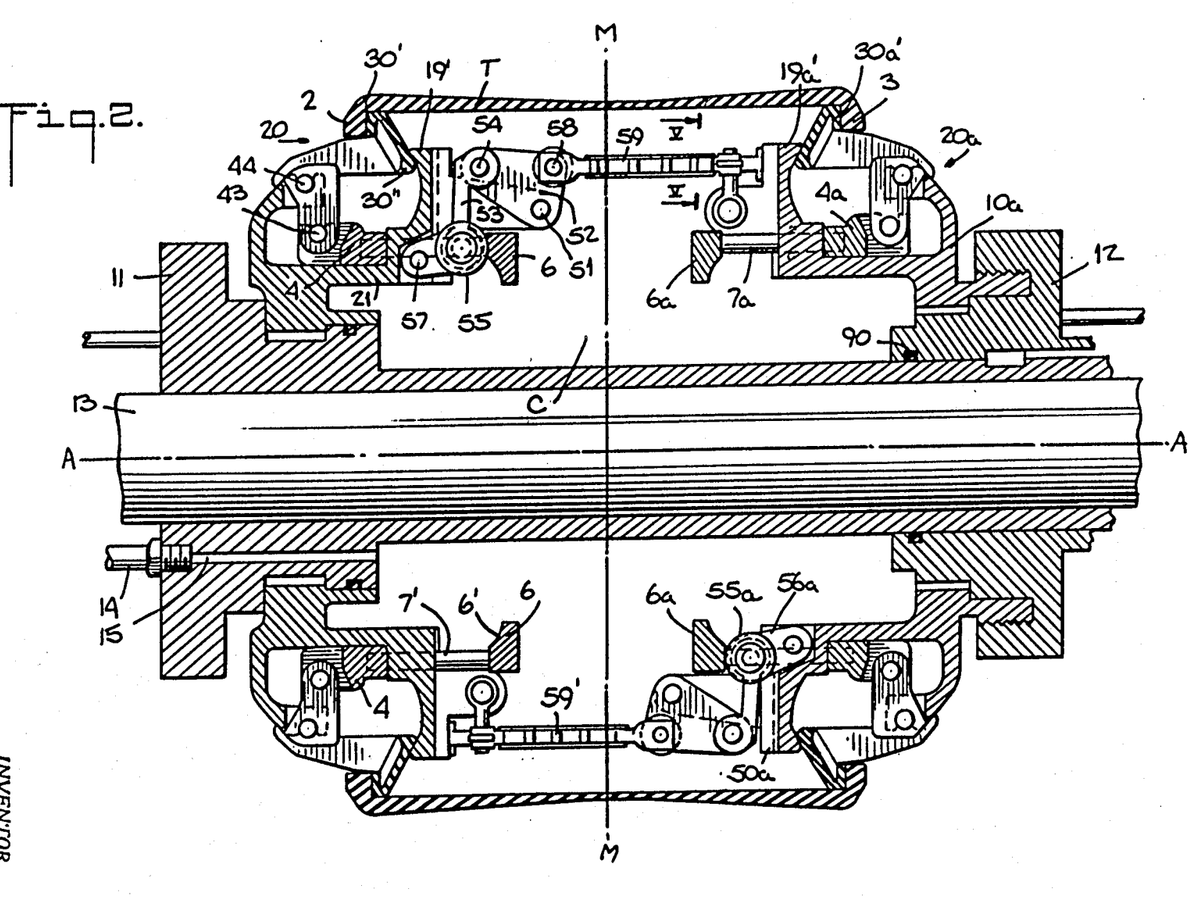
FIG. 2 is a sectional elevational view of the shaping apparatus according to the present invention showing the latter in a second condition of operation.

It will also be seen that axial movement of the ring 4 from its one end position close to the flange 18 (FIG. 1), toward its other end position close to the flange 19 (FIG. 2) results in outward radial movement of segments 45 which, in turn, results in radial expansion of the continuous elastomeric band 30 into the expanded condition thereof illustrated in FIG. 2. In this expanded condition of the band 30 one marginal edge portion 30' thereof forms a continuous fluidtight seal with the corresponding bead 2 of the cylindrical tire carcass T while the other marginal edge portion thereof 30'' forms a continuous fluidtight seal with the uppermost annular lip 19' of the flange 19.

The diameter of the flange 19 is chosen such that the cylindrically shaped first stage carcass T may be readily shifted axially thereover, without interference, into the position illustrated in FIG. 1. The outer annular flange 18 is preferably of reduced diameter with respect to the flange 19, and the band 30, when in contracted condition, displays a maximum diameter (FIG. 1) which latter is no larger than the smallest inside diameter of a carcass T. Thus, the carcass T may be slipped axially into the FIG. 1 position thereof without encountering interference and thus without any excessive distortion of the cylindrical carcass T. When a carcass T is in the proper axial position on the support, i.e., symmetrical with respect to the median plane M, the carcass rests with opposite bead portions 2 and 3 thereof on the downwardly and inwardly sloping outer edge portions 46 and 46a, respectively, of the circumferentially distributed groups of arms 40 and 40a (FIG. 1). In response to movement of the segments 45 and 45a of the arms 40 and 40a outwardly, as will be described below, the bead portions 2 and 3 of carcass T will slide along the edges 46 and 46a, respectively, until they are fluidtightly engaged by the marginal regions 30' and 30'a of the continuou bands 30 and 30a, respectively (FIG. 2).

Radial movement of the segments 45 is preferably accomplished as follows. A bracket 50 is fixed to the outer side of flange 19 and extends in the direction of ring means 10a. A first triangular link 52 is suitably articulately connected to bracket 50 for pivotal movement with respect thereto about an axis 51. A second link 53 is articulately connected at 54 to the first link 52 and carries at its opposite end a roller 55 adapted to engage with its periphery an arcuate cam surface 6' of the ring 6. Cocentric with the roller 55 there is articulately connected to the link 53 one end portion of a third link 56. The other end of link 56 is pivotally connected at 57 to the flange 19 of ring means 10, in a suitably recessed portion thereof. It will be seen that pivotal movement of triangular link 52 clockwise about 51 as viewed in FIG. 1, results in upward movement of link 53 which, in turn, causes link 56 to rotate in counterclockwise direction about its pivot axis 57. As a result, the roller 55 is displaced in a direction toward the inclined cam surface 6' of ring 6, displacing the latter ring axially to the right as seen in FIG. 1. As explained above, such axial movement of ring 6 is transferred to ring 4 and results in pivotal movement of the arms 40 in a direction to expand the band 30.

Figure 5:
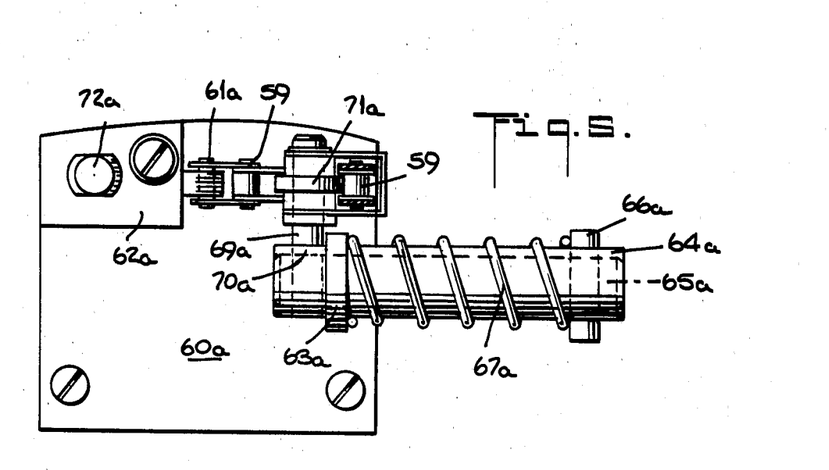
FIG. 5 is a view taken along line V—V of FIG. 2 showing, in enlarged scale, the biasing arrangement according to one embodiment of the present invention.
Figure 6:
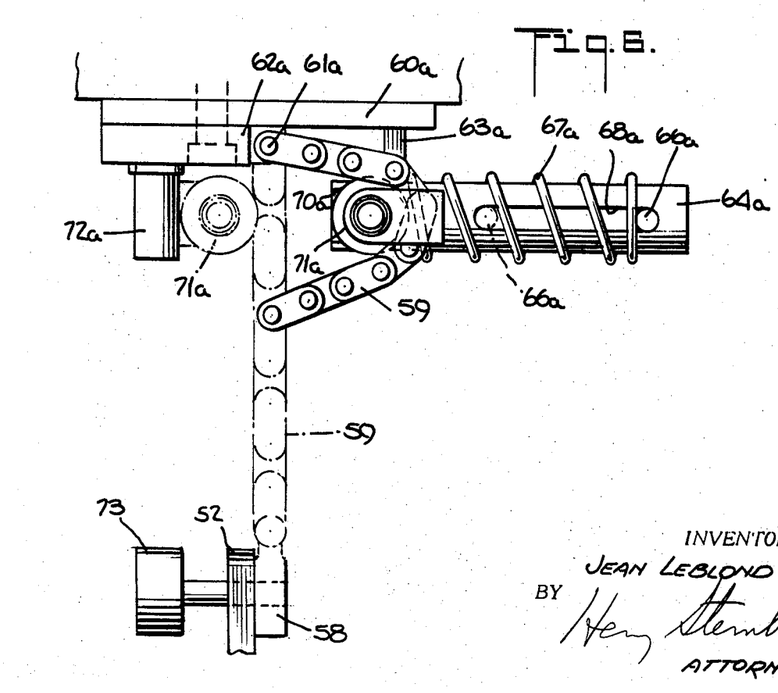
FIG. 6 is a top plan view of the biasing arrangement shown in FIG. 5.
Figure 7:
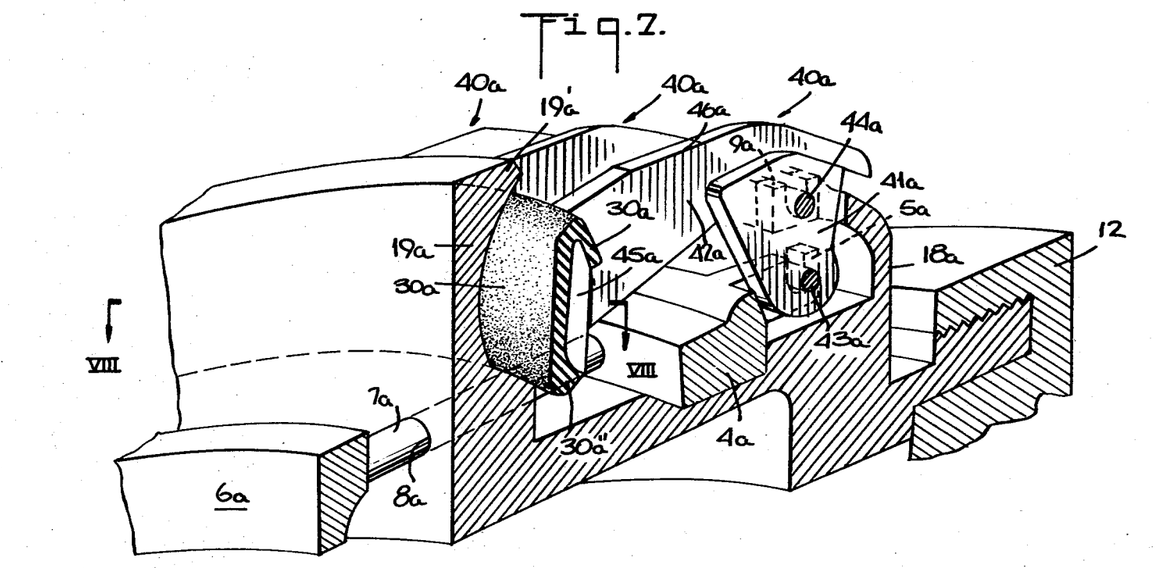
FIG. 7 is a partial, partly sectional, perspective view of the radially expansible and contractible means in the position thereof shown in FIG. 1.

Articulately connected to the triangular link 52 at a location 58 thereon, spaced from the axes 51 and 54, is one end of an elongated flexible non-elastic member, preferably in the form of a chain 59, whose other end is articulately connected to a bracket 60a fixed to the annular flange 19a of ring means 10a. As best seen in FIGS. 5 and 6, the chain 59 is articulately connected at 61a to a tab 62a extending from bracket 60a which is fixed to the outer face of flange 19a. A second bracket 63a extends outwardly from bracket 60a and is suitably fixed thereto. Bracket 63a is integrally connected with and supports a hollow cylinder 64a having a plunger 65a axially movable therein. The cylinder 64a is positioned so that its axis will be substantially normal to the direction of elongation of chain 59 but at a different elevation. The plunger 65a is provided with a transverse outwardly projecting pin 66a. A coil spring 67a is received intermediate the bracket 63a and the pin 66a which latter has its opposite ends slidably received in diametrically opposed axially elongated slots 68a provided on the cylinder 64a. It will be seen that coil spring 67a normally acts to maintain the pin 66a and thus the plunger 65a in the end position thereof illustrated in FIGS. 5 and 6.

At that end of the plunger 65a which is spaced from pin 66a there is affixed a stub axle 69a whose axis is normal to the axis of plunger 65a. A suitable recess 70a is provided in the cylinder 64a to permit movement of the axle 69a together with the plunger 65a to and from the position illustrated in FIGS. 5 and 6. A pulley member 71a is rotatably mounted on the axle 69a and entrains the chain 59 in a manner urging the latter, under the influence of spring 67a, to the position illustrated in heavy lines in FIG. 6. The members 60a through 71a thus constitute a tensioning means for maintaining the chain 59 permanently tensioned. Thus it will be seen, that movement of the ring means 10 and 10a toward each other will result in the chain 59 assuming the condition thereof illustrated in heavy lines in FIGS. 5 and 6, while movement of the ring means away from each other will result in a straightening of the chain 59 in opposition to the bias of spring 67a, toward the condition thereof illustrated by chain lines in FIG. 6.

The control means of the present invention includes the links 52, 53 and 56 together with the aforesaid tensioning means 60a–71a and the respective ring 6 and rods 7.

Figure 4:
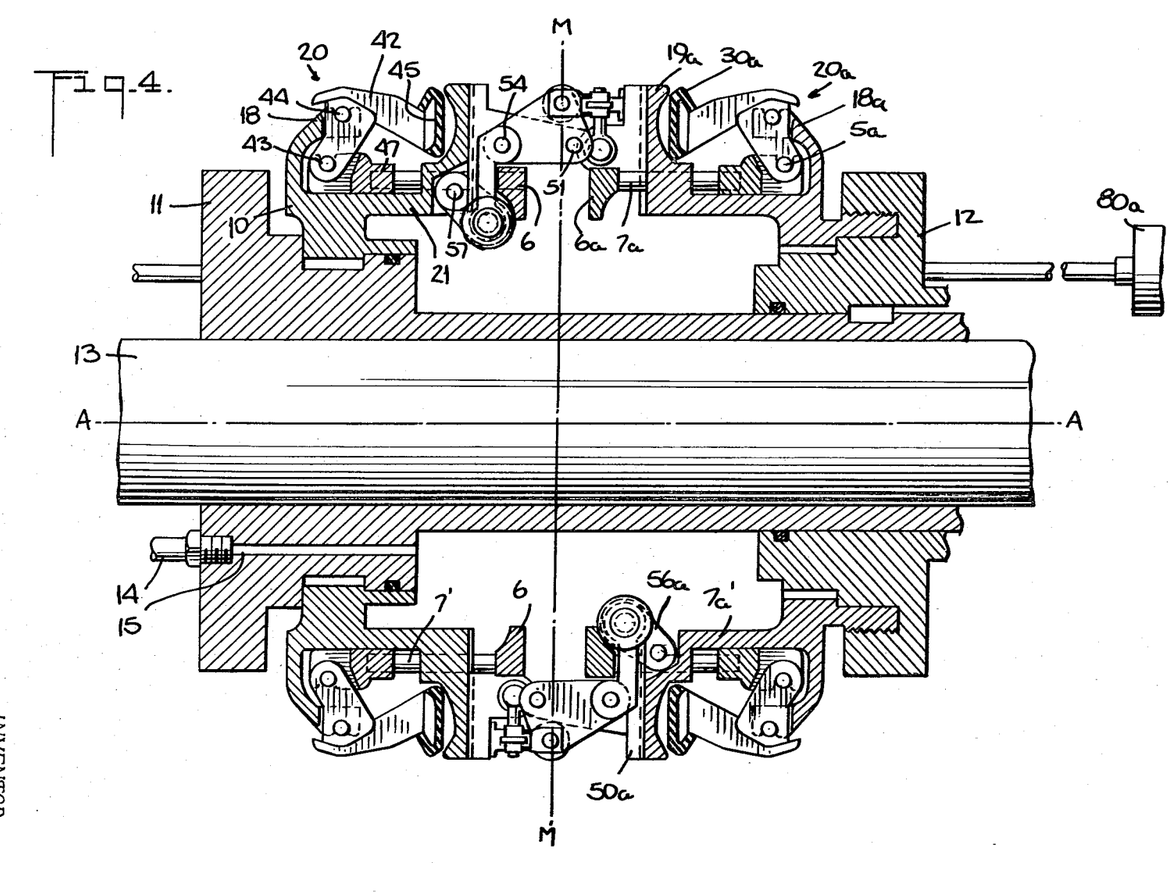
FIG. 4 is a sectional view of the apparatus in a final condition of operation thereof.

A release means whose functions will be described more clearly below, is provided in the form of a stop 72a fixedly mounted on and projecting outwardly from plate 62a in the direction of ring means 10, and a roller 73 rotatably mounted on link 52 coaxially with pivot 58 thereon and disposed laterally in registry with the stop 72a so as to be engaged thereby when the ring means 10 and 10a are in their axially retracted condition, i.e. closely spaced, as illustrated in FIG. 4.

While the two illustrated diametrically opposed linkage, tension and release means (FIG. 1) are quite adequate for accomplishing the stated purpose it will be understood that alternatively three or more sets of such means may be provided and still be within the scope of the present invention.

The radially expansible and contractible means, according to the present invention, comprises the plurality of circumferentially distributed arms 40 for expanding the endless elastomeric band 30 from the position thereof illustrated in FIG. 1 to the position thereof illustrated in FIG. 2.

In the preferred form the number of arms 40 of said expansible and contractible means is such that the arc included by the segmental portions 45 of each of the arms 40 is approximately 15° i.e. approximately 24 such arms are preferably distributed circumferentially about each of the ring means 10 and 10a.

OPERATION

In describing the operation of the circular carcass support of the present invention it will be assumed that initially the elements of the support are in the position thereof illustrated in FIG. 1. A first stage carcass T is shifted axially onto the support until it is in the position illustrated in FIG. 1. It will be seen that such axial mounting can be accomplished without any deformation of the tire carcass. To initiate operation the shifting means 80, 80a is actuated to move the ring means 10 and 10a axially away from one another to the position illustrated in FIG. 2. It should be noted that all axial relative movements of the ring means 10 and 10a are at all times symmetrical with respect to the median plane M—M. The movement of ring means 10 and 10a away from each other from the FIG. 1 to the FIG. 2 position, results in an axial pull on the fully extended chain member 59, which latter, in turn, causes link 52 to rotate clockwise (FIG. 1) about its pivot axis 51. Axis 54 is thus moved in the same clockwise direction, carrying with it the link 53 which, in turn, pivots the link 56 in counterclockwise direction about its pivot axis 57. Meanwhile, the chain 59' cooperates in similar fashion with the links 52a, 53a, and 56a. Consequently, the rollers 55 and 55a which are respectively in contact with the rings 6 and 6a shift the latter in opposite axial directions, i.e., toward each other. The rings 4 and 4a which are integrally connected to the rings 6 and 6a, via rods 7 and 7a, respectively, thus also move axially toward one another. The result is a relative movement between the teeth 9 and the teeth 5, and between the teeth 9a and the teeth 5a, respectively, thus causing the arms 40 and 40a of the radially expansible and contractible means to be pivoted from their positions illustrated in FIG. 1 to the position thereof illustrated in FIG. 2, i.e., radially outwardly into expanded condition. It will be obvious that in this expanded condition the circumferentially distributed segments 45, which were substantially in end-to-end abutment in their contracted condition (FIG. 8), are slightly angularly spaced from one another. As a result, the elastic band 30 is now in radially expanded i.e., stretch condition (FIG. 2) with marginal edge 30' thereof in circumferentially continuous sealing engagement with the bead 2 of the carcass T and the other marginal edge 30'' thereof in circumferentially continuous sealing engagement with the upper lip 19' of flange 19. Meanwhile, the elastomeric band 30a has assumed a similar position, in fluidtight continuous circumferential engagement with the opposite bead 3 of tire carcass T and with the corresponding upper lip 19'a of flange 19a.

The rods 7 and 7a are fluidtightly received in the bores 8 and 8a, respectively, of flange 19. To accomplish this there may be used any conventional means such as for example rubber O-rings (not shown) positioned around the interior of each such bore in sealing engagement with the respective rod. Similarly, the connection between the ring means 10 and its supporting sleeve member 11, as well as the connection between the ring means 10a and its supporting sleeve member 12 is a fluidtight one so that pressure fluid, for example compressed air, cannot escape therebetween. There may also be provided O-rings 90 or other conventional sealing means between the relatively movable sleeves 11 and 12.

As is well known the carcass T of a tubeless tire has a wall structure which is gas impervious so that, with the elements in the positions indicated in FIG. 2, there is formed between the ring means 10 and 10a and the interior of the carcass T, a fluidtight chamber C into which a pressure fluid, e.g. air, may be admitted via conduits 14 and 15.

A pair of opposing sidewall shaping rings 16 and 17 which may be of the type described in copending patent application Ser. No. 717,786, filed Apr. 1, 1968 are mounted for axial movement toward each other in symmetry with the median plane M. The shaping rings 16 and 17 are moved into engagement with the beads 2 and 3, respectively, after the carcass T is seated on the bands 30 and 30a as illustrated in FIG. 2. It will be seen that shaping rings 16 and 17 press inwardly against the opposite beads of the carcass T and assist in maintaining the beads seated firmly on the elastomeric bands 30 and 30a, respectively.

Figure 3:
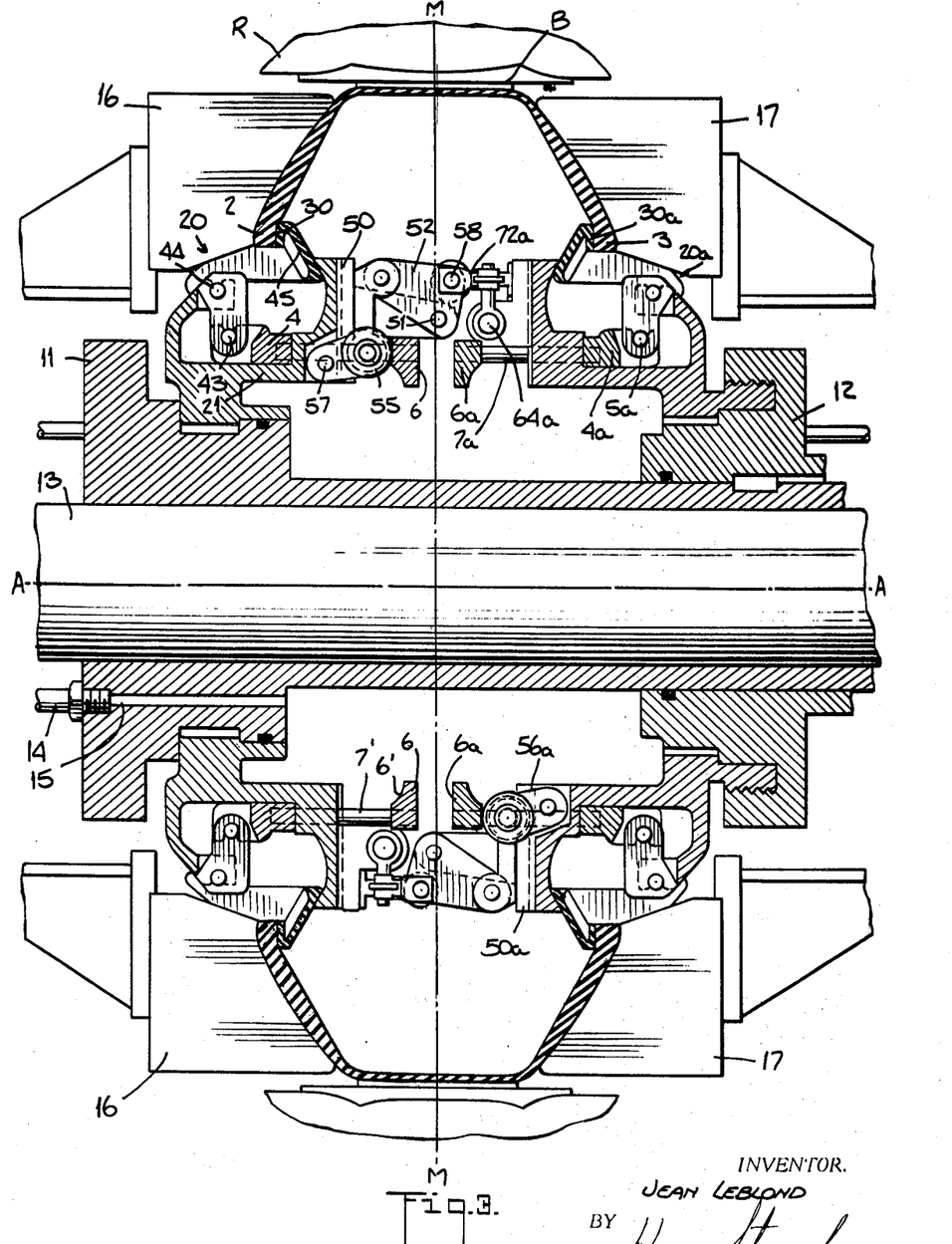
FIG. 3 is a sectional view of the apparatus according to the present invention showing the latter in a third condition of operation thereof and showing also, schematically, sidewall shaping members and tread applicator means cooperating with the apparatus.

The shaping rings 16 and 17 are arranged to follow the movement of the ring means 10 and 10a, when the shifting means 80, 80a is actuated to move the ring means 10 and 10a toward each other from the FIG. 2 to the FIG. 3 position thereof while simultaneously pressure fluid is admitted into the fluidtight chamber C. During such movement of the ring means 10 and 10a toward each other in symmetry with plane M therefore, the rings 16 and 17 maintain the beads 2 and 3 in good engagement with the bands 30 and 30a respectively.

The compressed air which is introduced simultaneously with said movement of the ring means 10 and 10a toward one another inflates the tire carcass T as a result of the sealing action provided by the elastic bands 30 and 30a.

When the circular support reaches the axially retracted and radially expanded condition thereof (FIG. 3) the carcass T thereon will assume the desired toroidal shape. A breaker-tread assembly B on transfer ring R may now be positioned thereon in the manner described in the aforesaid copending patent application.

Once the breaker-tread assembly B is adhered to the carcass T, the transfer ring R and the shaping rings 16 and 17 are all removed and the breaker-tread assembly B on carcass T may then be stitched by a conventional roller stitching mechanism (not shown) to cause greater adherence of the breaker-tread assembly to the carcass. Upon completion of the stitching operation, the fluid pressure within the carcass T is released. Then the ring means 10 and 10a are moved even closer toward each other. In other words, the ring means 10 and 10a are moved from the position illustrated in FIG. 3 to an even more closely spaced position (FIG. 4) in order to facilitate removal of the second stage carcass from the shaping support.

It will be understood that in moving the ring means 10 and 10a from the intermediate position (FIG. 3) toward each other to their closest position (FIG. 4), the stop 72a (FIGS. 5 and 6) engages the roller 73 (FIG. 4) forcing the latter and therewith the link 52 to pivot in a counterclockwise direction about pivot means 51. The resulting downward movement of the link 53 presses roller 55 radially inwardly with respect to ring 6, i.e. out of locking engagement with latter, thus releasing the radially expansible means 20, 20a to the action of the stretched elastomeric bands 30, 30a respectively. It will be seen that these elastomeric bands permanently urge the respective expansible and contractible means 20, 20a into the contracted condition thereof illustrated in FIG. 4. As soon as the ring 6 is released for axial movement, by said roller 55 moving from locking position (FIG. 3) to release position (FIG. 4), the radially expansible and contractible means 20 and the elastomeric band 30 stretched thereover, assumes its contracted condition (FIG. 4) so that the second stage carcass T may now be readily removed from the shaping drum without risking any distortion of the carcass elements during such removal.

Preparatory to placing a new first stage carcass on the shaping drum, ring means 10 and 10a are moved away from each other from their fully radially and axially contracted (FIG. 4) position to their radially contracted but axially partially expanded position (FIG. 1). Such axial expansion movement extends the chain 59 in opposition to the force of spring 67a. It will be noted that the force of spring 67a is not sufficient, by itself, to overcome the bias of the elastomeric band 30 which urges the radially expansible means 20 to remain in the contracted condition thereof (FIG. 4) until the chain 59 is fully extended (FIG. 1) at which time additional axial movement of the ring means 10 and 10a away from each other toward the FIG. 2 position thereof causes the now fully extended chain 59 to move the roller 55 into its locking position (FIG. 2) with respect to ring 6. The spring force on chain 59 is however chosen such as to be sufficient to maintain the radially expansible means in the expanded condition thereof (FIG. 2) during later movement of the ring means 10 and 10a toward each other, i.e. during toroidal shaping of the tire carcass (FIG. 3). There should be noted in this connection that in the radially expanded condition of the apparatus (FIG. 2) the roller 55 is in engagement with a flat portion of the outer cam surface of ring member 6, which flat portion lies in a plane normal to the axis A—A so as to effectively lock ring 6 against axial movement. In this position, also, the pivot axis 57 is located closer to the axis A—A than the axis of roller 55 thus facilitating the locking action by preventing contraction of the radially expansible means 20 under the influence of the bias of elastomeric band 30.

The shaping drum, according to the present invention, has the additional advantage of being rapidly converted to tire carcasses of different size, particularly those having the same inner bead diameter but having different widths. If it is desired to convert the apparatus to accept such a tire carcass having a different width, it is merely necessary to change the length of the chains 59. The latter may be accomplished rapidly with the use of chains having readily attachable and detachable chain links, such as are known to those skilled in the art. Corresponding adjustments will, of course, have to be made to the shifting means for varying the extent of movement of the ring means toward and away from each other. Such adjustments are, however, normally simple to make and are well within the knowledge of those skilled in the art.

It will be understood by those skilled in the art that suitable conventional electrical and fluid circuits would be employed in the foregoing tire building machine to automatically or manually regulate the various movements of the various parts of the machine as well as to synchronize the operations of the various components of the machine with respect to one another.

While particular embodiments of this invention have been shown and described, it will be obvious to those skilled in the art that various changes and modifications may be made without departing from this invention in its broader aspects, and it is, therefore, intended in the appended claims to cover all such changes and modifications as fall within the true spirit and scope of this invention.

Having thus described my invention, what I claim and desire to secure by Letters Patent is:

1. In a tire building apparatus, in combination:
 a pair of coaxial ring means;
 means mounting said ring means for relative axial movement thereof toward and away from each other;
 at least one of said ring means having a circumferentially extending wall portion and including in the region of said wall portion a circumferentially disposed radially expansible and contractible means, said expansible and contractible means being angularly displaceable with respect to axis of said ring means;
 an annular elastically deformable band member trained around said radially expansible and contractible and angularly displaceable means; and
 actuating means associated with said radially expansible and contractible and angularly displaceable means for moving the latter between a radially and angularly retracted position in which said elastically deformable band member is in contracted condition for permitting a tire carcass to be axially shifted onto and off said ring means and a radially and angularly extended position in which said elastically deformable band member is in expanded condition for sealingly circumferentially engaging with its outer edge portion the adjacent bead of the tire carcass positioned therearound and simultaneously with its inner edge portion sealingly circumferentially engaging said wall portion of said one ring means.

2. The apparatus according to claim 1 further comprising bead sealing means circumferentially disposed on the other of said pair of ring means.

3. The apparatus according to claim 2 wherein said bead sealing means comprises a second radially expansible and contractible means circumferentially disposed on the other of said pair of ring means;
 a second endles elastically deformable member trained around said second radially expansible and contractible means; and actuating means cooperating with said second expansible and contractible means for moving the latter between a radially retracted position in which said second elastically deformable member is in contracted condition for permitting a tire carcass to be axially shifted onto and off said ring means and radially extended position in which said second elastically deformable members is in expanded condition for sealingly circumferentially engaging the adjacent bead of the tire carcass positioned therearound.

4. The apparatus according to claim 1 wherein said one ring means comprises an annular wall portion, said deformable member expanding also into circumferentially continuous sealing engagement with said annular wall portion in response to movement of said radially expansible and contractible means into said radially extended position thereof, whereby said deformable member forms a fluidtight connection beteen said annular wall portion and the adjacent tire bead.

5. In a tire building apparatus, in combination:
 a pair of coaxial ring means; means mounting said ring means for relative axial movement therebetween; a pair of coaxial annular elastically deformable bands each disposed on a respective one of said ring means; and radially expansible and contractible means on said ring means and associated with said bands for expanding the latter from a contracted condition in which said bands permit the beads of a tire carcass to slip axially thereover, to an expanded condition in which said bands respectively sealingly engage the opposite beads of the tire carcass, said radially expansible and contractible means comprising a plurality of circumferentially distributed radially movable arms for supporting each of said bands.

6. The apparatus according to claim 5 further comprising shifting means associated with said ring means for relatively axially shifting the latter toward and away from each other.

7. The apparatus according to claim 5 wherein each of said ring means comprises fluidtight hub means, said bands in said expanded condition thereof forming a fluidtight connection between each of the respective hub means and its adjacent bead so as to form with the interior of the carcass a fluidtight chamber.

8. The apparatus according to claim 7 further comprising fluid pressure means communicating with said chamber for inflating said carcass.

9. The apparatus according to claim 5 wherein said elastically deformable bands are in at least slightly expanded condition even in said contracted condition thereof whereby said bands normally bias said radially expansible and contractible means toward the contracted position thereof.

10. The apparatus according to claim 5 further comprising shifting means associated with said ring means for moving the latter between a first end position in which said ring means are close to each other and a second end position in which said ring means are spaced further from each other and release means associated with said pair of ring means for releasing said pair of radially expansible and contractible means to the biasing action of said bands when said ring means are moved into said first end position thereof.

11. The apparatus according to claim 5 wherein each of said arms includes a radially extending body portion and a transversely extending wall portion connected to one end of said body portion, said wall portions together defining a circumferentially substantially continuous surface on each of said ring means, respectively, when said radially expansible and contractible means is in contracted position so as to provide a substantially continuous rigid annular support for each of said bands.

12. The apparatus according to claim 11 further comprising pivot means provided on said body portion of each of said arms for pivotally supporting said arms with respect to the remainder of the corresponding one of said ring means.

13. The apparatus according to claim 11 wherein said wall portions of said arms are ring segments, said segments on each of said ring means forming a group of generally annularly disposed segments, adjacent ones of said segments having adjacent ends in colse proximity when said radially expansible and contractible means is in contracted position, said adjacent ends being slightly angularly spaced from each other when said radially expansible and contractible means is in expanded position, each of said bands being stretched over the respective one of said groups of segments and permanently urging the latter into its contracted condition.

14. The apparatus according to claim 5 further comprising control means for displacing said bands respectively between said contracted and said expanded conditions thereof in response to relative axial movement of said ring means with respect to each other said control means operatively connecting said radially expansible and contractible means associated with one of said ring means with the other of said ring means and connecting said radially expansible and contractible means on the other said ring means with said one ring means.

15. In a tire building apparatus, in combination:
a pair of coaxial ring means;
radially expansible means provided on each of said ring means and adjustable between a contracted and an expanded condition;
a pair of elastomeric bands circumferentially stretched respectively over said expansible means and adapted to be deformed by said expansible means from a contracted condition in which said bands permit a tire carcass to be slipped axially thereover, to an expanded condition in which said bands respectively sealingly engage the opposite beads of the tire carcass as well as circumferential portions of said ring means for forming a circumferentially continuous seal between the respective ring means and said beads, said ring means defining with the interior of the carcass a fluid-tight chamber;
fluid pressure means communicating with said chamber for supplying pressure fluid thereto;
shifting means operatively connected to said ring means for axially relatively shifting the latter between a first position in which said ring means are closer to each other and a second position in which said ring means are spaced further from each other;
control means cooperating with both said ring means for moving said radially expansible means into said expanded condition thereof in response to shifting of said ring means into said second position thereof and for maintaining said expansible means in said expanded condition thereof during shifting of said radially expansible means from said second position toward said first position thereof; and
release means provided on one of said ring means and engageable with said control means in response to said pair of ring means arriving at said first position thereof for activating said control means to release said radially expansible means to the action of said elastomeric bands whereby the latter urge said radially expansible means into said contracted condition thereof.

16. In a tire building apparatus, in combination:
a pair of coaxial ring means;
radially expansible means provided on each of said ring means and adjustable between a contracted and an expanded condition;
a pair of endless elastomeric bands circumferentially stretched respectively over said expansible means and adapted to be deformed by said expansible means from a contracted condition in which said bands permit a tire carcass to be slipped axially therearound, to an expanded condition in which each of said bands sealingly engages a respective one of the beads of the tire carcass and circumferentially continuous portions of the corresponding ring means for forming a circumferential seal between the respective ring means and said beads, said ring means defining with the interior of the carcass a fluidtight chamber when said bands are in said expanded condition thereof;
fluid pressure means communicating with said chamber for supplying pressure fluid thereto;
shifting means operatively connected to said ring means for axially relatively shifting the latter toward and away from each other;
control means operatively connected to said radially expansible means and cooperating with both said ring means for moving said radially expansible means into said expanded condition thereof in response to shifting of said ring means from a first position in which said ring means are spaced from each other to a second position in which said ring means are spaced further from each other than in said first position thereof and for maintaining said expansible means in said expanded condition thereof during shifting of said ring means from said second through said first and into a third position in which said ring means are closer to each other than in said first position; and
release means provided on one of said ring means and engageable with said control means in response to said pair of ring means moving through said third closely spaced position thereof into an even more closely spaced fourth position, said release means actuating said control means to release said pair of radially expansible means to the action of said elastomeric bands, whereby the latter urge said radially expansible means into said contracted condition thereof;
whereby a cylindrically shaped tire carcass coaxially positioned on said ring means and sealingly engaged by said elastomeric bands may be formed into toroidal shape in response to relative movement of the ring means and therewith the beads of the tire carcass toward one another and simultaneous introduction of pressure fluid to said chamber.

17. The apparatus according to claim 16 wherein said control means comprises a mechanical linkage including a chain member and tension means associated with said chain member for permanently tensioning the latter.

18. The apparatus according to claim 16 wherein each of said ring means comprises a cylindrical portion and an annular flange extending radially from said cylindrical portion, said elastomeric bands having an inner portion adapted to circumferentially sealingly engage the respective annular flange and an outer portion adapted to circumferentially sealingly engaging the respective tire carcass bead when said beads are in said expanded condition thereof so as to form in said expanded condition a fluidtight connection between the respective bead and the respective ring means.

19. In a tire building apparatus, in combination:
a pair of coaxial ring means;
a pair of coaxial annular elastically deformable bands disposed respectively on said ring means;
radially expansible and contractible means associated with said elastically deformable bands for expanding and contracting the latter between a first condition in which said bands have an annular substantially planar shape and in which the diameter of each of said bands is such as to permit the beads of a tire to slip axially thereover and a second condition in which said bands have an annular substantially conical shape, said bands having inner and outer edge portions adapted to respectively sealingly engage peripheral portions of said ring means and of the beads of the tire so as to form a fluidtight connection therebetween for forming with said ring means and with the interior of said tire a fluidtight chamber;
a source of pressure fluid communicating with said chamber; and
shifting means cooperating with said ring means for relatively axially shifting the latter toward and away from each other;
whereby a cylindrically shaped tire carcass coaxially positioned on said ring means and sealingly engaged at opposed bead regions thereof by said bands, respectively, may be formed into toroidal shape by the application of pressure fluid to said chamber and by the simultaneous relative movement of said ring means toward each other.

20. The tire building apparatus according to claim 19 wherein said radially expansible and contractible means comprises on each of said ring means a plurality of circumferentially distributed arms pivotably supported on said ring means, each of said arms having a band engaging end portion movable in radial direction between a position closer to the axis of said ring means and a position spaced further from said axis.

21. The tire building apparatus according to claim 19 wherein each of said ring means comprises an annular flange portion, said elastomeric bands in said contracted condition thereof being out of sealing engagement with said annular flange portions and in said expanded condition thereof sealingly circumferentially engaging said annular flange portions as well as said tire beads so as to form a fluidtight connection between said annular flange portions and the tire.

22. The apparatus according to claim 21 further comprising means fluidtightly connecting said annular flange portions of said pair of ring means.

23. The apparatus according to claim 19, further comprising means adapted to engage the opposite side-walls of the tire at the exterior thereof for assisting in forming of the latter into toroidal shape.

24. The apparatus according to claim 19 wherein said elastomeric bands are adapted to engage the bead regions of the tire carcass at opposed inwardly facing annular edge portions thereof.

25. In a tire building apparatus, in combination:
a pair of coaxial ring means each comprising a pair of relatively axially movable ring members;
a pair of coaxial annular elastically deformable bands disposed respectively on said ring means;
radially expansible and contractible means associated with said elastically deformable bands for expanding and contracting the latter between a first condition in which the diameter of each of said bands is such as to permit the beads of a tire to slip axially thereover and a second condition in which said bands respectively sealingly engage the opposite beads of the tire, said bands in said second condition thereof forming with said ring means and with the interior of said tire a fluidtight chamber, said radially expansible and contractible means on each of said ring means comprising a plurality of peripherally distributed arms pivoted on both the respective pair of ring members so as to pivot in radial direction in response to relative axial movement of one ring member with respect to the other ring member of the respective pair of ring members;
a source of pressure fluid communicating with said chamber; and
shifting means cooperating with said ring means for relatively axially shifting the latter toward and away from each other;
whereby a cylindrically shaped tire carcass coaxially positioned on said ring means and sealingly engaged at opposed bead regions thereof by said bands, respectively, may be formed into toroidal shape by the application of pressure fluid to said chamber and by the simultaneous relative movement of said ring means toward each other.

26. The apparatus according to claim 25 wherein each of said ring members is provided with a plurality of peripherally distributed teeth each of which is provided with a circumferentially extended peripheral groove, said ring members of each pair being angularly in registry with each other, and said arms being located respectively intermediate adjacent ones of said teeth, each of said arms being provided with a pair of spaced circumferentially extending shafts received in said grooves of registering pairs of adajacent ones of said teeth of the respective pair of said ring members.

27. The tire building apparatus according to claim 26, further comprising control means including linkage means provided on one of said ring members of one of said ring means for moving said one ring member of said one ring means with respect to the other ring member of said one ring means in response to predetermined relative axial movement of said pair of ring means.

28. The apparatus according to claim 27 wherein said control means comprises an elongated flexible member and means connecting said flexible member at opposite ends thereof to said linkage means and to said other ring means, respectively.

29. The apparatus according to claim 28 further comprising bias means cooperating with said flexible member for maintaining the same under tension.

30. The apparatus according to claim 29 wherein said linkage means comprises a plurality of articulately connected links, said other ring member comprising a pair of integrally connected axially spaced annular members one of which has an inclined surface, and a roller provided on one of said links and adapted to move in transverse engagement with said inclined surface of said one annular member for axially shifting said other ring member with respect to said one ring member in response to articulation of said links.

31. The apparatus according to claim 19 wherein said radially expansible and contractible means associated with one of said elastic bands on one of said ring means is operatively connected to the other of said ring means so as to be activated by predetermined relative movement between said one and said other ring means.

32. The apparatus according to claim 19 wherein one of said ring means includes an axially entending sleeve portion and the other of said ring means is axially slidably received on said sleeve portion, and sealing means provided intermediate said ring means for forming a fluidtight connection therebetween.

33. The apparatus according to claim 19 wherein said elastomeric bands consist of rubber and include flanged edge portions adapted in said expanded condition of said bands to respectively sealingly engage continuous peripheral portions of the respective ring means and the corresponding tire bead so as to form a fluidtight seal therebetween.

34. Tire shaping apparatus for toroidally shaping a cylindrical first stage carcass having a fluid impervious wall structure comprising, in combination:
a pair of coaxial ring means for receiving the first stage carcass;
shifting means operatively connected with said ring means for axially moving the latter toward and away from each other;
sealing means on each of said ring means for fluidtightly connecting said ring means to the respective bead portions of the tire carcass so as to form with the interior of the carcass as fluidtight chamber, each of said sealing means comprising radially expansible and contractible and angularly displaceable means and a continuous annular elastomeric band associated with said radially expansible and contractible and angularly displaceable means for forming said fluidtight connection; and
pressure fluid means communicating with said chamber for supplying pressure fluid thereto so as to radially expand the mid-portion of the cylindrical carcass when said ring means are moved toward each other, whereby the carcass will assume a toroidal shape.

35. In a tire building apparatus:
a pair of coaxial variably spaced rings for supporting a carcass thereon;
a pair of expandable, contractible and angularly displaceable mechanical means, one provided on each of said rings peripherally thereof; and a pair of endless elastic bands one provided on each of said rings trained around the corresponding one of said expandable, contractible and angularly displaceable mechanical means and adapted to be expanded and angularly displaced by the latter from a position in which said bands are generally planar and have a maximum diameter smaller than the inner diameter of the bead of the tire carcass to be supported thereon so that the tire carcass may be readily mounted and dismounted, to a position in which said bands are generally conical and sealingly circumferentially engage the respective beads for permitting direct inflation of the carcass.

References Cited

UNITED STATES PATENTS

| | | | |
|---|---|---|---|
| 1,667,263 | 4/1928 | Mather | 156—414 |
| 2,960,130 | 11/1960 | Smyser | 144—228(1) |
| 3,107,192 | 10/1963 | McNenney | 156—415X |
| 3,134,079 | 5/1964 | Giletta et al. | 156—416X |
| 3,184,361 | 5/1965 | Allitt | 156—415 |
| 3,374,138 | 3/1968 | Porter et al. | 156—417X |
| 3,408,244 | 10/1968 | Frazier | 156—415X |

SAMUEL FEINBERG, Primary Examiner

S. C. BENTLEY, Assistant Examiner